(12) United States Patent
Cao et al.

(10) Patent No.: US 8,290,154 B2
(45) Date of Patent: Oct. 16, 2012

(54) METHODS AND APPARATUSES FOR KEY GENERATION, ENCRYPTION AND DECRYPTION IN BROADCAST ENCRYPTION

(75) Inventors: Zhenfu Cao, Shanghai (CN); Huang Lin, Shanghai (CN); Xiaolei Dong, Shanghai (CN); Xiaohui Liang, Shanghai (CN); Dongsheng Xing, Shanghai (CN)

(73) Assignee: Sony Corporation, Tokyo (JP)

( * ) Notice: Subject to any disclaimer, the term of this patent is extended or adjusted under 35 U.S.C. 154(b) by 273 days.

(21) Appl. No.: 12/761,852

(22) Filed: Apr. 16, 2010

(65) Prior Publication Data

US 2010/0272260 A1    Oct. 28, 2010

(30) Foreign Application Priority Data

Apr. 24, 2009    (CN) .......................... 2009 1 0137370

(51) Int. Cl.
*H04L 9/00*    (2006.01)
(52) U.S. Cl. ......................................... 380/44; 380/200

(58) Field of Classification Search .............. 380/44–47, 380/200; 725/25, 31
See application file for complete search history.

(56) References Cited

U.S. PATENT DOCUMENTS 5,966,449 A *    10/1999   Iwamura et al. ................ 380/44
2002/0044657 A1*  4/2002   Asano et al. .................. 380/201

* cited by examiner

*Primary Examiner* — Edward Zee
(74) *Attorney, Agent, or Firm* — Oblon, Spivak, McClelland, Maier & Neustadt, L.L.P.

(57) ABSTRACT

Methods and apparatuses for key generation, encryption and decryption in broadcast encryption. A public parameter and a primary key based on a first random number are generated. For each of leaf nodes in a binary tree, a right key set of the leaf node is calculated, the right key set including a right key of the leaf node and right keys of right brother nodes for all the nodes on a path from a root node to the leaf node. A left key set of the leaf node is calculated, the left key set including a left key of the leaf node and left keys of left brother nodes for all the nodes on the path. The sum of the second and third random numbers equals to the first random number. The second random number is different for different subscribers.

24 Claims, 5 Drawing Sheets

METHODS AND APPARATUSES FOR KEY GENERATION, ENCRYPTION AND DECRYPTION IN BROADCAST ENCRYPTION

This application claims priority to Chinese Patent Application No. 200910137370.9, filed with the Chinese Patent Office on Apr. 24, 2009 and entitled "Methods And Apparatuses For Key Generation, Encryption And Decryption In Broadcast Encryption", which is hereby incorporated by reference in its entirety.

FIELD OF THE INVENTION

The present invention relates to broadcast encryption, and especially to a method of and an apparatus for key generation, a method of and an apparatus for encrypting, and a method of and an apparatus for decryption.

BACKGROUND OF THE INVENTION

The broadcast encryption involves encrypting a message M by a subscriber (broadcaster) based on a subscriber set S to obtain a cipher text C and broadcasting the cipher text C through a common channel, wherein the set S is a subset which may be arbitrarily selected from all the subscribers by the broadcaster, and those subscribers in the set S are capable of decrypting the cipher text C to obtain the message M. The broadcast encryption may be applied in applications such as access control to an encrypted file system, subscription service for television, DVD content protection, conditional access for digital video broadcasting DVB and the like.

Various broadcast encryption schemes have been proposed. For example, two broadcast encryption schemes: BW1 scheme and BW2 scheme have been proposed in D. Boneh et al., "Collusion resistant broadcast encryption with short ciphertexts and private keys," CRYPTO, pages 258-275, 2005. For the BW1 scheme, its private key is of size $O(1)$, and its public key is of size $O(n)$; for the BW2 scheme, it private key is of size $O(\sqrt{n})$, and its public key is of size $O(\sqrt{n})$. An identity based broadcast encryption scheme has been proposed in C. Delerablee," identity-based broadcast encryption with constant size ciphertexts and private keys," ASIACRYPT, pages 200-215, 2007, wherein the cipher text and private key are of fixed size, and the public key size is a linear function of maximum size, allowed by the system, of the set S for authorized receiving subscribers. The drawback of the Delerablee's scheme lies in that it can be proved secure only in the random oracle model. Moreover, in the above two schemes, because the public key is involved in the decryption process, the corresponding public key has to be transmitted along with the broadcasted cipher text. Therefore, the cipher text size can be in direct proportion to the number of all the subscribers, or can be in direct proportion to the maximum size of set S of authorized receiving subscribers allowed by the system. Three broadcast encryption schemes having public keys of fixed size have been proposed in Liu and Tzeng, "Public key broadcast encryption with low number of keys and constant decryption time," Public Key Cryptography, pages 380-396, 2008. The first scheme has a cipher text size of $O(r)$ and a private key size of $O(\log n)$; the second scheme has a cipher text size of $O(r)$ and a private key size of $O(\log^2 n)$; the third scheme has a cipher text size of $O(r/\epsilon)$ and a private key size of $O(\log^{1+\epsilon} n)$, wherein r is the number of subscribers whose decryption privilege has been revoked. Liu and Tzeng's schemes have the same drawback in that they can be proved secure only in the random oracle model, and have a transmission bandwidth in direct proportion to r. This means that their schemes are not applicable if the number of subscriber whose decryption privileges have been revoked increases to some extent.

SUMMARY OF THE INVENTION

In view of the above deficiencies of the prior art, the present invention intends to providing a method of and an apparatus for key generation in broadcast encryption, a method of and an apparatus for encryption, and a method of and an apparatus for decryption, to at least in part overcome the above deficiencies.

An embodiment of the present invention is a method of key generation based on the hierarchical identity based encryption scheme (HIBE), comprising: generating a public parameter and a primary key through the initializing method of the encryption scheme, wherein the primary key is based on a first random number; with respect to each of leaf nodes in a binary tree where subscriber identities are represented by the leaf nodes in the same level, calculating a right key set of the leaf node according to the encryption scheme based on the public parameter, the identity of the leaf node and a right primary key obtained by replacing the first random number with a second random number, the right key set including a right key of the leaf node and right keys of right brother nodes for all the nodes on a path from a root node to the leaf node; and with respect to the leaf nodes, calculating a left key set of the leaf node according to the encryption scheme based on the public parameter, the identity of the leaf node and a left primary key obtained by replacing the first random number with a third random number, the left key set including a left key of the leaf node and left keys of left brother nodes for all the nodes on the path from the root node to the leaf node, wherein the sum of the second random number and the third random number equals to the first random number, and the second random number is different for different subscribers.

Another embodiment of the present invention is a method of encryption based on the hierarchical identity based encryption scheme, comprising: dividing the identities of the subscribers entitled to decrypt a broadcast content into at least one interval; with respect to each of the interval, encrypting the broadcast content through the encrypting method of the encryption scheme based on the public parameter of the encryption scheme, the lower limit of the interval and a random number associated with the interval, to generate a cipher text and header information associated with the lower limit; and with respect to each of the interval, encrypting the broadcast content through the encrypting method of the encryption scheme based on the public parameter of the encryption scheme, the upper limit of the interval and the random number associated with the interval, to generate a cipher text and header information associated with the upper limit, wherein the symmetrical key adopted by the encrypting method of the encryption scheme is based on the random number, and the random number associated with the respective interval is different from each other.

Another embodiment of the present invention is a method of decryption based on the hierarchical identity based decrypt scheme, comprising: receiving information about intervals into which the identities of subscribers entitled to decrypt a broadcast content are divided, a cipher text and header information associated with lower limit of each of the intervals, and a cipher text and header information associated with upper limit of each of the intervals; finding one of the intervals where the identity of the receiving subscriber resides, such that in a binary tree where subscriber identities are represented by leaf nodes in the same level, the left key of one node on a path from a root node to the lower limit node of the interval is included in the left key set of the receiving node corresponding to the identity of the receiving subscriber, and the right key of one node on a path from the root node to the upper limit node of the interval is included in the right key set of the receiving node; calculating the left key of the lower limit node through the key deriving method of the encryption scheme based on the public parameter, the identity of the node whose left key is included in the left key set and the left key of the node; calculating the right key of the upper limit node through the key deriving method of the encryption scheme based on the public parameter, the identity of the node whose right key is included in the right key set and the right key of the node; obtaining a first session key through the decrypting method of the encryption scheme based on the header information associated with the lower limit of the found interval, the left key of the respective lower limit node, the lower limit and the public parameter; obtaining a second session key through the decrypting method of the encryption scheme based on the header information associated with the upper limit of the found interval, the right key of the respective upper limit node, the upper limit and the public parameter; obtaining the symmetrical key based on the first session key and the second session key; and decrypting the cipher text associated with the found interval with the symmetrical key.

Another embodiment of the present invention is an apparatus for encryption based on the hierarchical identity based encryption scheme, comprising: a subscriber grouping device which divides the identities of the subscribers entitled to decrypt a broadcast content into at least one interval; a first encrypting device which, with respect to each of the interval, encrypts the broadcast content through the encrypting method of the encryption scheme based on the public parameter of the encryption scheme, the lower limit of the interval and a random number associated with the interval, to generate a cipher text and header information associated with the lower limit; and a second encrypting device which, with respect to each of the interval, encrypts the broadcast content through the encrypting method of the encryption scheme based on the public parameter of the encryption scheme, the upper limit of the interval and the random number associated with the interval, to generate a cipher text and header information associated with the upper limit; wherein the symmetrical key adopted by the encrypting method of the encryption scheme is based on the random number, and the random number associated with the respective interval is different from each other.

Another embodiment of the present invention is an apparatus for key generation based on the hierarchical identity based encryption scheme, comprising: an initialization device which generates a public parameter and a primary key through the initializing method of the encryption scheme, wherein the primary key is based on a first random number; a right key set generating device which, with respect to each of leaf nodes in a binary tree where subscriber identities are represented by the leaf nodes in the same level, calculates a right key set of the leaf node according to the encryption scheme based on the public parameter, the identity of the leaf node and a right primary key obtained by replacing the first random number with a second random number, the right key set including a right key of the leaf node and right keys of right brother nodes for all the nodes on a path from a root node to the leaf node; and a left key set generating device which, with respect to the leaf nodes, calculates a left key set of the leaf node according to the encryption scheme based on the public parameter, the identity of the leaf node and a left primary key obtained by replacing the first random number with a third random number, the left key set including a left key of the leaf node and left keys of left brother nodes for all the nodes on the path from the root node to the leaf node, wherein the sum of the second random number and the third random number equals to the first random number, and the second random number is different for different subscribers.

Another embodiment of the present invention is an apparatus for decryption based on the hierarchical identity based encryption scheme, comprising: a receiving device which receives information about intervals into which the identities of subscribers entitled to decrypt a broadcast content are divided, a cipher text and header information associated with lower limit of each of the intervals, and a cipher text and header information associated with upper limit of each of the intervals; a searching device which finds one of the intervals where the identity of the receiving subscriber resides, such that in a binary tree where subscriber identities are represented by leaf nodes in the same level, the left key of one node on a path from a root node to the lower limit node of the interval is included in the left key set of the receiving node corresponding to the identity of the receiving subscriber, and the right key of one node on a path from the root node to the upper limit node of the interval is included in the right key set of the receiving node; a key deriving device which calculates the left key of the lower limit node through the key deriving method of the encryption scheme based on the public parameter, the identity of the node whose left key is included in the left key set and the left key of the node, and calculates the right key of the upper limit node through the key deriving method of the encryption scheme based on the public parameter, the identity of the node whose right key is included in the right key set and the right key of the node; and a key recovering device which obtains a first session key through the decrypting method of the encryption scheme based on the header information associated with the lower limit of the found interval, the left key of the respective lower limit node, the lower limit and the public parameter, obtains a second session key through the decrypting method of the encryption scheme based on the header information associated with the upper limit of the found interval, the right key of the respective upper limit node, the upper limit and the public parameter, and obtains the symmetrical key based on the first session key and the second session key; and a decrypting device which decrypts the cipher text associated with the found interval with the symmetrical key.

In the above embodiments, the encryption scheme may be a binary tree encryption (BTE) scheme of a maximum depth $d=\lceil \log_2 n \rceil$, wherein the public parameter includes a function randomly selected from 4d−1-wise independent family of functions, where n is the number of the plurality of subscribers.

In the above embodiments, the encryption scheme may also be a Boneh-Boyen-Goh encryption scheme of a maximum depth $d=\lceil \log_2 n \rceil$, where n is the number of the plurality of subscribers.

In the above embodiments, the public parameter may comprise a first $g_3$ parameter and a second $g_3$ parameter different from each other, wherein the first $g_3$ parameter is used for the generation of the right key set, and the second $g_3$ parameter is used for the generation of the left key set.

In the above embodiments of the present invention, if the security is reduced to Decisional Bilinear Diffie-Hellman Assumption in the standard model, the public key size is $O(\log n)$, the cipher text size is $O(k)$, and the key size is $O(\log n)$ (if the random oracle model is introduced, the public key size can be a constant), wherein k represents the number of intervals. Because the size of the public key and the key can be irrelevant to the number of subscribers whose decryption privilege has been revoked, and the cipher text size depends on the number of intervals which is usually always smaller than r, it is possible to achieve an efficiency higher than that of Liu and Tzeng's schemes. For example, when the number of subscriber whose decryption privilege has been revoked increases, Liu and Tzeng's schemes may be no longer applicable. In this case, however, because the set S corresponding to authorized subscribers is still small in size, the number of intervals included is still small accordingly, and the present invention can be still applicable in this case. On the other hand, the security achieved be the above embodiments of the present invention is proved secure in the standard model, higher than that of proved secure for the prior art in the random oracle model. In addition, the underlying assumption which the above embodiments of the present invention are based on is weaker than that of the prior art, further increasing the security.

BRIEF DESCRIPTION OF THE DRAWINGS

The above and/or other aspects, features and/or advantages of the present invention will be easily appreciated in view of the following description by referring to the accompanying figures. In the accompanying drawings, identical or corresponding technical features or components will be represented with identical or corresponding reference numbers.

DETAILED DESCRIPTION OF THE INVENTION

Figure 1:
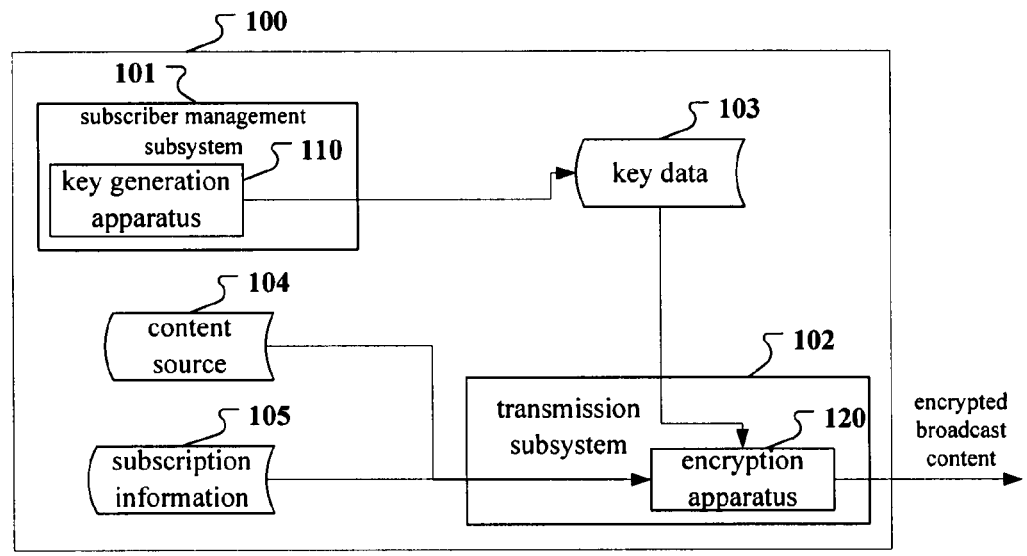
FIG. 1 is a schematic diagram showing the general configuration of a broadcast system based on broadcast encryption.

The embodiments of the present invention are below described by referring to the drawings. It is to be noted that, for purpose of clarity, representations and descriptions about those components and processes known by those skilled in the art but unrelated to the present invention are omitted in the drawings and the description.

Broadcast System and Subscriber Equipment

FIG. 1 is a schematic diagram showing the general configuration of a broadcast system 100 based on broadcast encryption. As shown in FIG. 1, the broadcast system 100 comprises a subscriber management subsystem 101 and a transmission subsystem 102.

The subscriber management subsystem 101 manages information for subscribers registered to the broadcast system 100, and allocates an identity identifier and a key to a newly registered subscriber. A key generation apparatus of the subscriber management subsystem 101 is responsible for initializing the encryption scheme and generating the key for the subscriber. Data obtained through the initialization and the key generated for the subscriber are stored as key data 103. The key generation apparatus 110 may also be independent of the subscriber management subsystem 101 or the broadcast system 100, and may also run previously to perform the initialization and key generation. The key generated for the subscriber and other information required for decryption are supplied to the subscriber equipment. The key and other information may be supplied to the subscriber equipment through a communication medium (for example, wired communication, wireless communication and etc.), storage medium (for example, optical disk, memory, magnetic disk and etc.), manually input and etc.

In case that a content broadcast is to be performed by the broadcast system 100, the transmission subsystem 102 obtains the content to be broadcasted from a content source 104, and obtains information on subscribers entitled to present (i.e., decrypt) the content from subscription information 105. The encryption apparatus 120 of the transmission subsystem obtains relevant data from the key data 103, and performs encryption on the content with respect to the subscribers entitled to perform the decryption, so that only these subscribers are capable of decrypting the content. It should be noted that the content may be broadcasted in any broadcast form, for example, by distributing optical disks, distributing the content over a network, digital video broadcast and etc. Further, the encryption apparatus 120 may be independent of the transmission subsystem 102 or the broadcast system 100, and may also run previously to provide encrypted broadcast contents.

Figure 2:
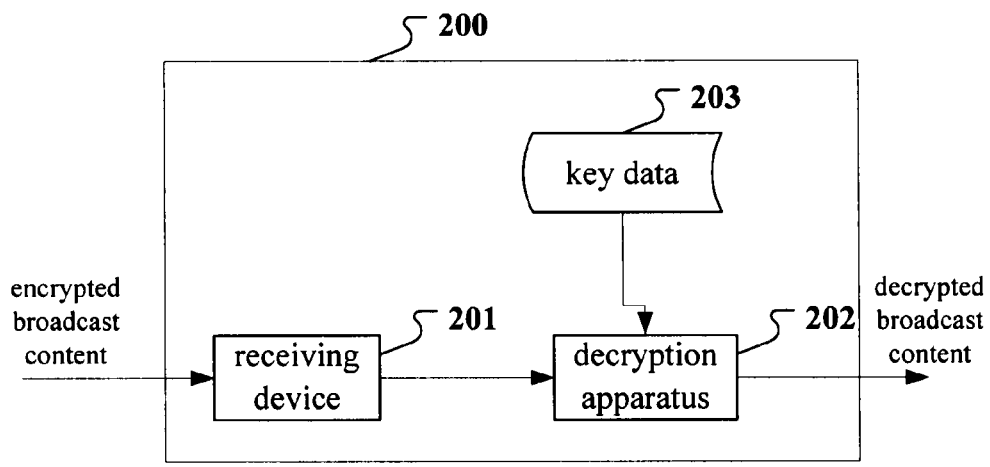
FIG. 2 is a schematic diagram showing the general configuration of a subscriber equipment for broadcast encryption.

FIG. 2 is a schematic diagram showing the general configuration of a subscriber equipment 200 for broadcast encryption. As shown in FIG. 2, the subscriber equipment 200 comprises a receiving device 201 and a decryption apparatus 202.

The receiving device 201 obtains an encrypted broadcast content carried by the communication medium or storage medium, for example. The decryption apparatus 202 performs decryption on the obtained encrypted broadcast content by using the key and the relevant information obtained upon subscriber registration. If the subscriber is not one who is entitled to decrypt the encrypted broadcast content, the subscriber cannot obtain the correctly decrypted broadcast content by using the subscriber's key and relevant information. Depending on specific applications, the subscriber equipment may be a set-top box, a television set, a mobile terminal, a personal computer and etc., and the decrypted broadcast content may be presented to the subscriber, may be stored or undergoes other further processes.

HIBE Based Interval Encryption—Key Generation

In the HIBE scheme, each of identities $i=i_1 \ldots i_t$, wherein, $i_1, \ldots, i_t \in \{0,1\}$ can be represented with one node of a binary tree. Each node i has a key $SK_i$, wherein the key of the root node is a primary key or root key $SK_\epsilon = x^\alpha$, $\epsilon$ represents a null string, x represents an element of bilinear group $G_1$, $\alpha$ is a random number. According to the key $SK_i$ of the node i, it is able to calculate keys $SK_{i0}$ and $SK_{i1}$ of the node's child nodes i0 (representing i connected with 0) and i1 (representing i connected with 1). Upon encrypting a message M, header information HDR and cipher text $C=M\cdot d$ are generated according to the public parameter and identities i of subscribers entitled to perform decryption, wherein d is a symmetrical key. After receiving the header information HDR and the cipher text C, a subscriber i recovers the symmetrical key d from the HDR according to the public parameter and the key $SK_i$ allocated to him, and then calculates the message $M=C/d$ with the symmetrical key d, thereby completing the decryption. The symmetrical key d is usually in a form of bilinear map $\hat{e}(g,SK_\epsilon)^\gamma = \hat{e}(g,x^\alpha)^\gamma = \hat{e}(g,x)^{\gamma\alpha}$, wherein g is an element randomly selected from the bilinear group $G_1$, $\gamma$ is a random number. For example, a HIBE scheme, i.e., Boneh-Boyen-Goh encryption scheme has been described in Boneh et al., "Hierarchical Identity Based Encryption with Constant Size Ciphertext", Cryptology ePrint Archive, Report 2005/015, 2005, wherein the symmetrical key d is $\hat{e}(g,SK_\epsilon)^\gamma = \hat{e}(g,g_2{}^\alpha)^\gamma = \hat{e}(g,g_2)^{\gamma\alpha} = \hat{e}(g^\alpha,g_2)^\gamma = \hat{e}(g_1,g_2)^\gamma$, $g_1 = g^\alpha$, $g_2$ represent the public parameter, primary key $SK_\epsilon = g_2{}^\alpha$.

Figure 3:
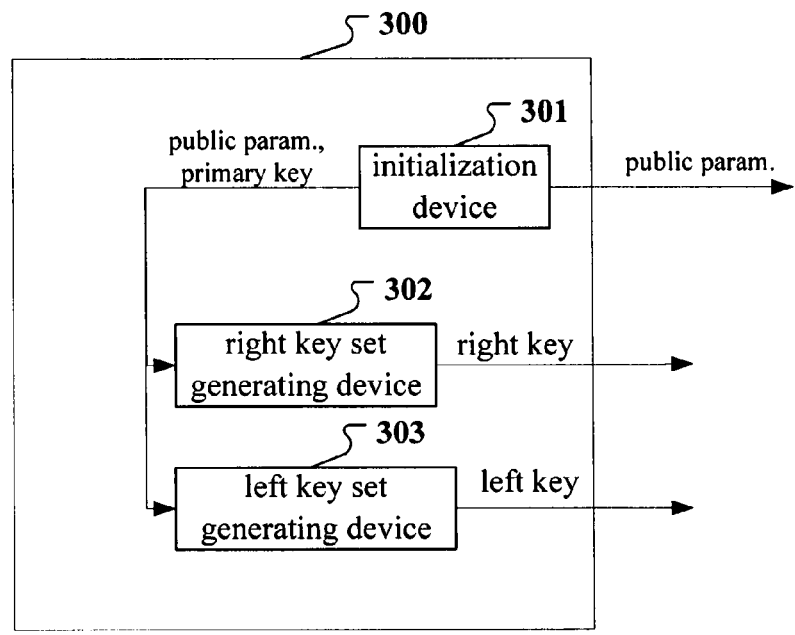
FIG. 3 shows an exemplary structure of a key generation apparatus based on the HIBE scheme, according to an embodiment of the present invention.

FIG. 3 shows an exemplary structure of a key generation apparatus 300 based on the HIBE scheme, according to an embodiment of the present invention.

As shown in FIG. 3, the key generation apparatus 300 comprises an initialization device 301, a right key set generating device 302 and a left key set generating device 303.

The initialization device 301 generates a public parameter (also called as master public key PK) and a primary key $SK_\epsilon = x^\alpha$. It can be seen that the primary key $SK_\epsilon$ is based on a first random number $\alpha$. Those skilled in the art know that x is an element of the public parameter and for different HIBE schemes, different public parameters can be defined.

Figure 4:
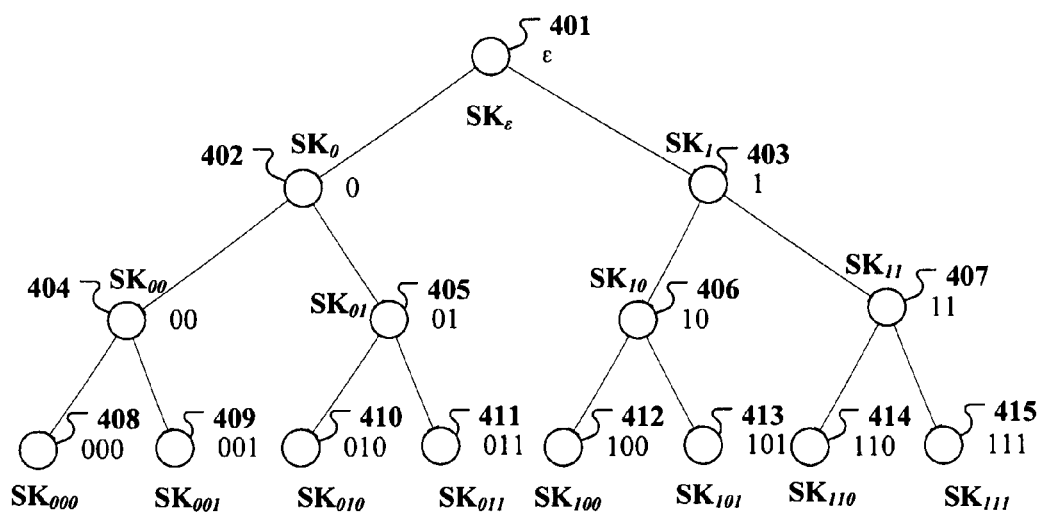
FIG. 4 is a schematic diagram showing an example of the binary tree including 8 subscribers.

As described earlier, nodes in a binary tree can be used to represent identities. In the embodiment of the present invention, peer leaf nodes in the binary tree are used to represent subscriber identities. For example, FIG. 4 is a schematic diagram showing an example of the binary tree including 8 subscribers. In FIG. 4, circles represent nodes. Characters strings left to the nodes represent the identities i represented by the node. A symbol $SK_i$ near to the node i represents the key allocated to the identity. The identities represented by nodes 408, 409, 410, 411, 412, 413, 414, 415 are that of subscribers 1-8.

In the binary tree (for example, binary tree as shown in FIG. 4) where subscriber identities are represented by peer leaf nodes, for each leaf node i, the right key set generating device 302 calculates the right key set $DR_i$ of the leaf node i from the public parameter PK, the identity of the leaf node i and the right primary key $SK_{\epsilon,R} = x^{\alpha_i}$ obtained by replacing the first random number $\alpha$ with a second random number $\alpha_i$, according to the HIBE scheme i.e., the key generating method of the HIBE scheme. The right key set $DR_i$ includes the right key $SK_{i,R}$ of the leaf node i and right keys $SK_{p,R}$ of right brother nodes p of all the nodes in the path from the root node to the leaf node i. Taking leaf node 413 in FIG. 4 as an example, its right key set DR includes $SK_{101,R}$, $SK_{11,R}$. Right keys of the respective nodes can be directly calculated based on the right primary key. Right key sets of the respective leaf nodes can be formed based on the calculated right keys of the respective nodes. It should be noted that the random number $\alpha_i$ is different for different subscribers.

In the binary tree (for example, binary tree as shown in FIG. 4) where subscriber identities are represented by peer leaf nodes, for each leaf node i, the left key set generating device 303 calculates the left key set $DL_i$ of the leaf node i from the public parameter PK, the identity of the leaf node i and the left primary key $SK_{\epsilon,L} = g^{\alpha - \alpha_i}$ obtained by replacing the first random number $\alpha$ with a third random number $\alpha - \alpha_i$, according to the HIBE scheme i.e., the key generating method of the HIBE scheme. The left key set $DL_i$ includes the left key $SK_{i,L}$ of the leaf node i and left keys $SK_{p,L}$ of left brother nodes p of all the nodes in the path from the root node to the leaf node i. Taking leaf node 412 in FIG. 4 as an example, its left key set DL includes $SK_{100,L}$, $SK_{0,L}$. Left keys of the respective nodes can be directly calculated based on the left primary key. Left key sets of the respective leaf nodes can be formed based on the calculated left keys of the respective nodes.

It can be seen that the sum of the second random number $\alpha_i$ and the third random number $\alpha - \alpha_i$ equals to the first random number $\alpha$.

Although the processes of the right key set generating device 302 and the left key set generating device 303 are described by referring to the example as shown in FIG. 4 in the above, it is to be noted that, for each node as shown in FIG. 4, the keys generated by the right key set generating device 302 and the left key set generating device 303 are generated respectively based on the right primary key and the left primary key.

Figure 5:
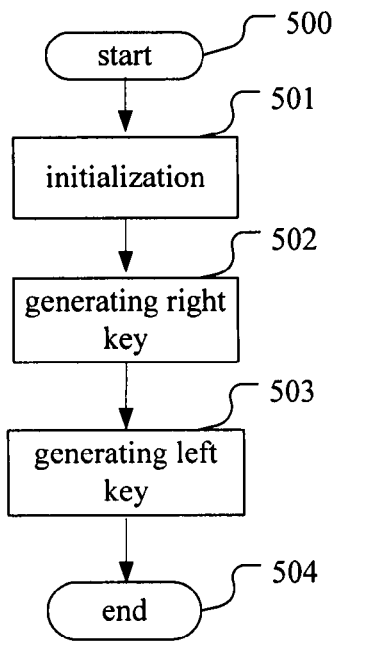
FIG. 5 is a flow chart showing a key generation method based on the HIBE scheme, according to an embodiment of the present invention.

FIG. 5 is a flow chart showing a key generation method based on the HIBE scheme, according to an embodiment of the present invention.

As shown in FIG. 5, the method starts from step 500. At step 501, a public parameter PK and a primary key $SK_\epsilon = x^\alpha$ are generated through the initialization method of the HIBE scheme. It can be seen that the primary key $SK_\epsilon$ is based on a first random number $\alpha$.

As described in the above by referring to FIG. 4, nodes in the binary tree can be used to represented identities, and peer leaf nodes in the binary tree may be used to represent subscriber identities.

At step 502, in the binary tree where subscriber identities are represented by peer leaf nodes, for each leaf node i, the right key set DR of the leaf node i is calculated from the public parameter PK, the identity of the leaf node i and the right primary key $SK_{\epsilon,R} = x^{\alpha_i}$ obtained by replacing the first random number $\alpha$ with a second random number $\alpha_i$ according to the HIBE scheme i.e., the key generating method of the HIBE scheme. The right key set DR includes the right key $SK_{i,R}$ of the leaf node i and right keys $SK_{p,R}$ of right brother nodes p of all the nodes in the path from the root node to the leaf node i. Right keys of the respective nodes can be directly calculated based on the right primary key. Right key sets of the respective leaf nodes can be formed based on the calculated right keys of the respective nodes. It should be noted that the random number $\alpha_i$ is different for different subscribers.

At step 503, in the binary tree where subscriber identities are represented by peer leaf nodes, for each leaf node i, the left key set DL of the leaf node i is calculated from the public parameter PK, the identity of the leaf node i and the left primary key $SK_{\epsilon,L} = x^{\alpha - \alpha_i}$ obtained by replacing the first random number $\alpha$ with a third random number $\alpha - \alpha_i$, according to the HIBE scheme i.e., the key generating method of the HIBE scheme. The left key set DL includes the left key $SK_{i,L}$ of the leaf node i and left keys $SK_{p,L}$ of left brother nodes p of all the nodes in the path from the root node to the leaf node i. Left keys of the respective nodes can be directly calculated based on the left primary key. Left key sets of the respective leaf nodes can be formed based on the calculated left keys of the respective nodes. Then the method ends at step 504.

It can be seen that the sum of the second random number $\alpha_i$ and the third random number $\alpha-\alpha_i$ equals to the first random number $\alpha$.

HIBE Based Interval Encryption—Encryption

Figure 6:
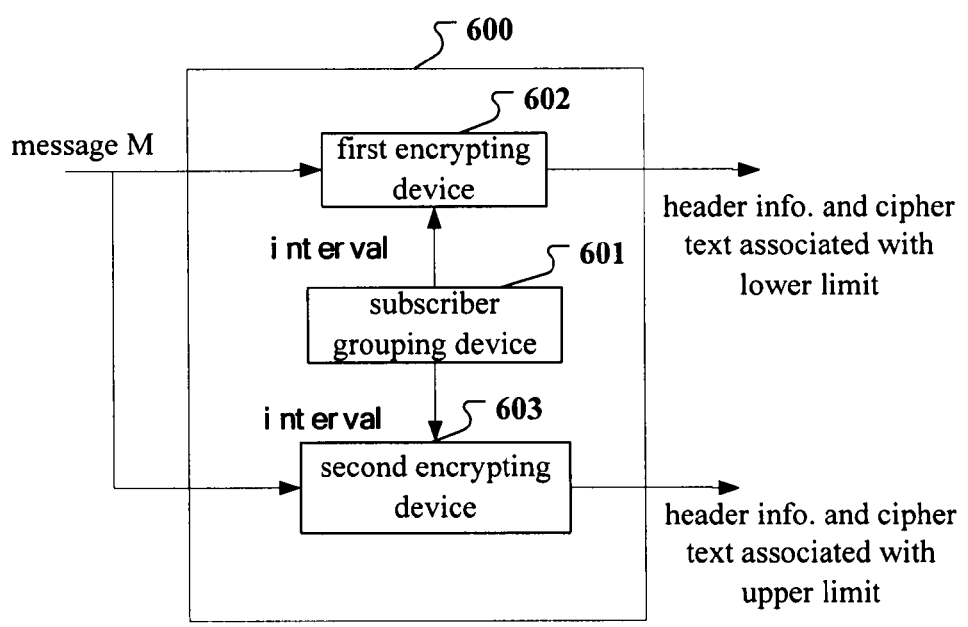
FIG. 6 shows an exemplary structure of an encryption apparatus based on the HIBE scheme, according to an embodiment of the present invention.

FIG. 6 shows an exemplary structure of an encryption apparatus 600 based on the HIBE scheme, according to an embodiment of the present invention.

As shown in FIG. 6, the encryption apparatus 600 includes a subscriber grouping device 601, a first encrypting device 602 and a second encrypting device 603.

The subscriber grouping device 601 divides the identities of the subscribers entitled to decrypt the broadcast content (i.e. message M) into at least one interval $NI_j=[l_j,r_j]$. Taking the subscriber identities as shown in FIG. 4 as examples, assuming that the subscribers of identities "000", "010", "011", "100", "110", "111" are entitled to decrypt the broadcast content, it is possible to divide these subscribers into three intervals, i.e. [000,000], [010,100], [110,111]. It can be seen that each interval does not include the subscriber identities which are not entitled to decrypt the broadcast content.

For each interval $NI_j$ thus divided, the first encrypting device 602 encrypts the broadcast content through the encrypting method of the HIBE scheme based on the public parameter PK of the HIBE scheme, the lower limit $l_j$ of the interval $NI_j$ and the random number $\gamma_j$ associated with the interval $NI_j$ (i.e., the random number on which the symmetrical key d is based), to generate cipher text $C_{j,L}$ and header information $HDR_{j,L}$ associated with the lower limit $l_j$. In encrypting, the adopted symmetrical key $d_j$ is $\hat{e}(g,SK_\epsilon)^{\gamma_j}$.

For each interval $NI_j$ thus divided, the second encrypting device 603 encrypts the broadcast content through the encrypting method of the HIBE scheme based on the public parameter PK of the HIBE scheme, the upper limit $r_j$ of the interval $NI_j$ and the random number $\gamma_j$ associated with the interval $NI_j$, to generate cipher text $C_{j,R}$ and header information $HDR_{j,R}$ associated with the upper limit $r_j$. In encrypting, the adopted symmetrical key is $\hat{e}(g,SK_\epsilon)^{\gamma_j}$.

It should be noted that the random numbers $\gamma_j$ associated with respective intervals $NI_j$ are different from each other.

Figure 7:
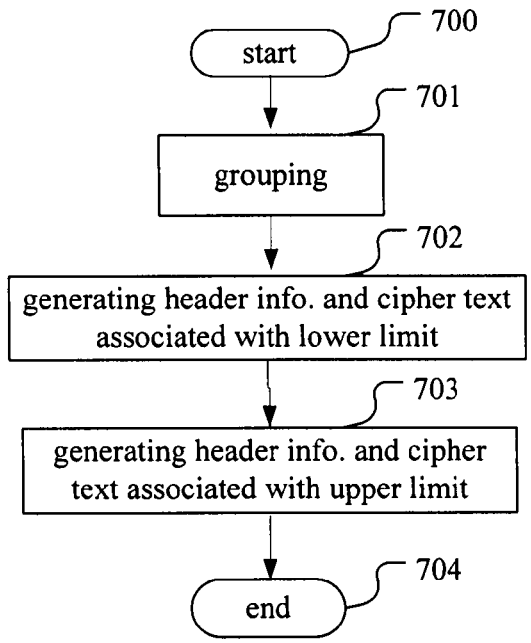
FIG. 7 is a flow chart showing an encrypting method based on the HIBE scheme, according to an embodiment of the present invention.

FIG. 7 is a flow chart showing an encrypting method based on the HIBE scheme, according to an embodiment of the present invention.

As shown in FIG. 7, the method starts from step 700. At step 701, the identities of the subscribers entitled to decrypt the broadcast content (i.e. message M) are divided into at least one interval $NI_j=[l_j,r_j]$.

At step 702, for each interval $NI_j$ thus divided, the broadcast content is encrypted through the encrypting method of the HIBE scheme based on the public parameter PK of the HIBE scheme, the lower limit $l_j$ of the interval $NI_j$ and the random number $\gamma_j$ associated with the interval $NI_j$ (i.e., the random number on which the symmetrical key d is based), to generate cipher text $C_{j,L}$ and header information $HDR_{j,L}$ associated with the lower limit $l_j$. In encrypting, the adopted symmetrical key is $\hat{e}(g,SK_\epsilon)^{\gamma_j}$.

At step 703, for each interval $NI_j$ thus divided, the broadcast content is encrypted through the encrypting method of the HIBE scheme based on the public parameter PK of the HIBE scheme, the upper limit $r_j$ of the interval $NI_j$ and the random number $\gamma_j$ associated with the interval $NI_j$, to generate cipher text $C_{j,R}$ and header information $HDR_{j,R}$ associated with the upper limit $r_j$. In encrypting, the adopted symmetrical key is $\hat{e}(g,SK_\epsilon)^{\gamma_j}$.

It should be noted that the random numbers $\gamma_j$ associated with respective intervals $NI_j$ are different from each other.

Then the method ends at step 704.

HIBE Based Interval Encryption—Decryption

Figure 8:
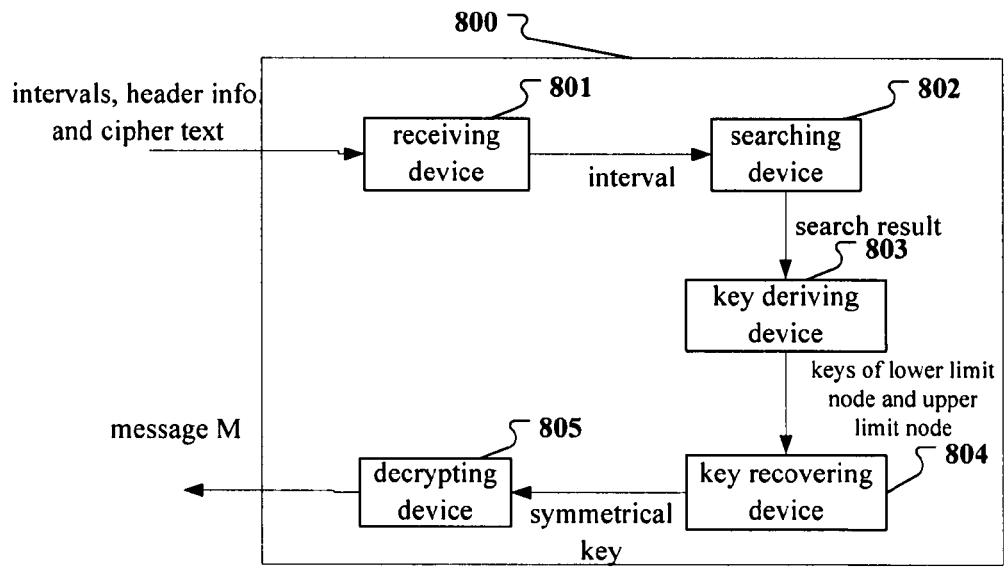
FIG. 8 shows an exemplary structure of a decryption apparatus based on the HIBE scheme, according to an embodiment of the present invention.

FIG. 8 shows an exemplary structure of a decryption apparatus 800 based on the HIBE scheme, according to an embodiment of the present invention.

As shown in FIG. 8, the decryption apparatus 800 includes a receiving device 801, a searching device 802, a key deriving device 803, a key recovering device 804 and a decrypting device 805.

The receiving device 801 receives information about the intervals $NI_j$ obtained by dividing identities of the subscribers entitled to decrypt the broadcast content (i.e. message M), cipher text $C_{j,L}$ and header information $HDR_{j,L}$ associated with the lower limit $l_j$ of each interval $NI_j$, and cipher text $C_{j,R}$ and header information $HDR_{j,R}$ associated with the upper limit $r_j$ of each interval $NI_j$.

The searching device 802 finds one interval $NI_k$ where the identity i of the receiving subscriber resides from these divided intervals $NI_j$, such that in a binary tree where subscriber identities are represented by leaf nodes in the same level (for example, the binary tree as shown in FIG. 4), the left key $SK_{m,L}$ of one node m on the path from the root node to the lower limit node $l_k$ of the interval $NI_k$ is included in the left key set $DL_i$ of the receiving node corresponding to the identity i of the receiving subscriber, and the right key $SK_{n,R}$ of one node n on the path from the root node to the upper limit node $r_k$ of the interval $NI_k$ is included in the right key set $DR_i$ of the receiving node. Taking the subscriber identities as shown in FIG. 4 as examples, assuming that the divided intervals are [000,000], [010,100], [110,111], subscriber 011 is a receiving subscriber, the left key set of the subscriber 011 DL= $\{SK_{011,L}, SK_{010,L}, SK_{00,L}\}$, and the right key set of the subscriber 011 DR=$\{SK_{011,R}, SK_{1,R}\}$. The found interval is [010, 100], the node m is node 010 indicated by reference sign 410, the node n is node 1 indicated by reference sign 403.

The key deriving device 803 calculates the left key of the lower limit node $l_k$ through the key deriving method of the HIBE scheme based on the public parameter PK, the identity m of the node whose left key is included in the left key set $DL_i$ and the left key $SK_{m,L}$ of the node, and calculates the right key of the upper limit node $r_k$ through the key deriving method of the HIBE scheme based on the public parameter PK, the identity n of the node whose right key is included in the right key set $DR_i$ and the right key $SK_{n,R}$ of the node. For example, in the above example, the right key $SK_{100,R}$ of the node 100 can be derived based on the right key $SK_{1,R}$ of the node 1.

The key recovering device 804 obtains a first session key $\hat{e}(g,x)^{\gamma_k(\alpha-\alpha_k)}$ through the decrypting method of the HIBE scheme based on the header information $HDR_k$ associated with the lower limit $l_k$ of the found interval $NI_k$, the left key of the respective lower limit node, the lower limit $l_k$ and the public parameter PK, obtains a second session key $\hat{e}(g,x)^{\gamma_k\alpha_k}$ through the decrypting method of the HIBE scheme based on the header information associated with the upper limit of the found interval $NI_k$, the right key of the respective upper limit node, the upper limit $r_k$ and the public parameter PK, and obtains the symmetrical key $\hat{e}(g,x)^{\gamma_k\alpha_k}\hat{e}(g,x)^{\gamma_k(\alpha-\alpha_k)}=\hat{e}(g,x)^{\gamma_k\alpha}= \hat{e}(g,x^\alpha)^{\gamma_k}=\hat{e}(g,SK_\epsilon)^{\gamma_k}$, i.e. symmetrical key $d_k$ based on the first session key and the second session key.

The decrypting device 805 decrypts the cipher text associated with the found interval $NI_k$ by the obtained symmetrical key $d_k$ to obtain the message M.

Figure 9:
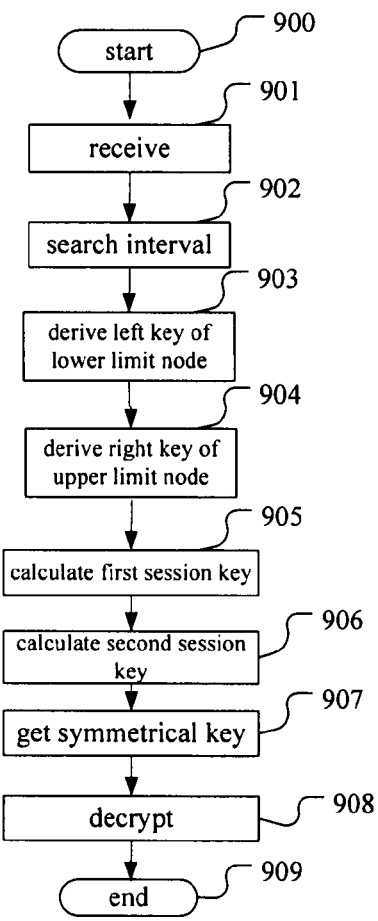
FIG. 9 is a flow chart showing a decryption method based on the HIBE scheme, according to an embodiment of the present invention.

FIG. 9 is a flow chart showing a decryption method based on the HIBE scheme, according to an embodiment of the present invention.

As shown in FIG. 9, the method starts from step 900. At step 901, information about the intervals $NI_j$ obtained by dividing identities of the subscribers entitled to decrypt the broadcast content (i.e. message M), cipher text $C_{j,L}$ and header information $HDR_{j,L}$ associated with the lower limit $l_j$ of each interval $NI_j$, and cipher text $C_{j,R}$ and header information $HDR_{j,R}$ associated with the upper limit $r_j$ of each interval $NI_j$ are received.

At step 902, one interval $NI_k$ where the identity i of the receiving subscriber resides is found from these divided intervals $NI_j$, such that in a binary tree where subscriber identities are represented by leaf nodes in the same level (for example, the binary tree as shown in FIG. 4), the left key $SK_{m,L}$ of one node m on the path from the root node to the lower limit node $l_k$ of the interval $NI_k$ is included in the left key set $DL_i$ of the receiving node corresponding to the identity i of the receiving subscriber, and the right key $SK_{n,R}$ of one node n on the path from the root node to the upper limit node $r_k$ of the interval $NI_k$ is included in the right key set $DR_i$ of the receiving node.

At step 903, the left key of the lower limit node $l_k$ is calculated through the key deriving method of the HIBE scheme based on the public parameter PK, the identity m of the node whose left key is included in the left key set $DL_i$ and the left key $SK_{m,L}$ of the node.

At step 904, the right key of the upper limit node $r_k$ is calculated through the key deriving method of the HIBE scheme based on the public parameter PK, the identity n of the node whose right key is included in the right key set $DR_i$ and the right key $SK_{n,R}$ of the node.

At step 905, a first session key $\hat{e}(g,x)^{\gamma_k(\alpha-\alpha_k)}$ is obtained through the decrypting method of the HIBE scheme based on the header information $HDR_k$ associated with the lower limit $l_k$ of the found interval $NI_k$, the left key of the respective lower limit node, the lower limit $l_k$ and the public parameter PK.

At step 906, a second session key $\hat{e}(g,x)^{\gamma_k\alpha_k}$ is obtained through the decrypting method of the HIBE scheme based on the header information associated with the upper limit of the found interval $NI_k$, the right key of the respective upper limit node, the upper limit $r_k$ and the public parameter PK.

At step 907, the symmetrical key $\hat{e}(g,x)^{\gamma_k\alpha_k}\hat{e}(g,x)^{\gamma_k(\alpha-\alpha_k)}=\hat{e}(g,x)^{\gamma_k\alpha}=\hat{e}(g,x^\alpha)^{\gamma_k}=\hat{e}(g,SK_\epsilon)^{\gamma_k}$, i.e. symmetrical key $d_k$ is obtained based on the first session key and the second session key.

At step 908, the cipher text associated with the found interval $NI_k$ is decrypted with the obtained symmetrical key $d_k$ to obtain the message M. Then the method ends at step 909.

According to the embodiment of the present invention, it is able to distinguish decrypting capabilities of subscribers within the intervals and subscribers out of the intervals. Specifically, a subscriber can only obtain left keys of other subscribers whose identities have the subscriber's identity as the upper limit, and right keys of other subscribers whose identities have the subscriber's identity as the lower limit. If the subscriber's identity is known within one interval, it is able to obtain the left key of the lower limit for the interval, and the right key of the upper limit for the interval. Thus it is able to recover the symmetrical key for the interval, thereby decrypting the respective cipher text. For a subscriber failed to reside in any interval, however, the subscriber cannot obtain both the left key of the lower limit and the right key of the upper limit for any interval, and thus cannot obtain the symmetrical key of any interval to decrypt the cipher text. Because the random number $\alpha_i$ is embedded upon allocating the subscriber's right private key, and the random number $(\alpha-\alpha_i)$ is embedded upon allocating the subscriber's left private key, only the same subscriber is capable of synthesizing the primary key $x^\alpha$. Because the random number embedded by each subscriber is different from one subscriber to another subscriber, the collusion attack of different subscribers becomes impossible. Because the cipher text for each interval is embedded with a unique random number $\gamma_j$, the random number $\alpha$ will be scrambled by these random numbers in the final decryption. Because the probability that the scrambled random number is identical to the correct random number can be negligible, it is able to prevent from the single-subscriber attack in case that a plurality of intervals exist. For example, subscriber 100 can decrypt a portion of cipher text corresponding to the lower limit of the corresponding interval [010, 011], and decrypt a portion of cipher text corresponding to the upper limit of the corresponding interval [101, 111]. There is a possibility of synthesizing the symmetrical key for the interval [010, 110] through the portions of cipher text obtained from these two decryptions.

Specific instances for the embodiments of the present invention will be described by referring to specific HIBE schemes.

Instance I

Preliminaries: Binary Tree Encryption Scheme (BTE)

The binary tree encryption scheme can be considered as a special case of the HIBE scheme. In the binary tree encryption scheme, the primary public key (i.e., public parameter) PK is associated with a tree T. Each node of the tree T corresponds to one key. A message is encrypted by corresponding it to a node. The PK and the name of the node (i.e., identity) are used in the encryption. The obtained cipher text can be decrypted with the key corresponding to the node. Based on the key of a node, the keys of its child nodes can be calculated.

Specifically, nodes i can be represented as $i_1 \ldots i_t$, wherein $i_1, \ldots, i_t \in \{0,1\}$. One node i can have two child nodes, that is, i0 (i is connected with 0) and i1 (i is connected with 1). The depth of the tree is represented by d.

The j-bit prefix of the character string $i(i=i_1 \ldots i_t)$ is represented by $i|_j$. For any character string, $i|_0=\epsilon$. $\epsilon$ represents a null string.

A 2d+1-wise independent family of functions is represented by $H_d$, where the definition domain is $\{0,1\}^{\leq d}$, and the value domain is $G_1$. Here, $G_1$ is a bilinear group of prime order q.

The binary tree encryption scheme is composed of the following five algorithms:

$Gen(1^k,1^d)$: This algorithm generates two bilinear group $G_1$, $G_2$ of prime order q. A bilinear map $\hat{e}$ is generated. An element g is randomly selected from $G_1$. The element $\alpha$ is randomly selected from $Z_q$. Lets $Q=g^\alpha$. A function H is randomly selected from $H_d$. The primary public key PK is $(G_1, G_2, \hat{e}, g, Q, H)$. The key for the root node of the tree T is $SK_\epsilon=H(\epsilon)^\alpha$.

The key for a non-null node $i=i_1 \ldots i_t$ includes t+1 group elements, marked as $SK_i=\{R_{i|_0}, R_{i|_1}, \ldots R_{i|_{t-1}}, S_i\}$, wherein $R_{i|_0}, R_{i|_1}, \ldots R_{i|di\ t-1}, S_i \in G_1$.

The key for the node $\epsilon$ is $SK_\epsilon=S_\epsilon=H(\epsilon)^\alpha$.

$Der(PK,i,SK_i)$: This algorithm outputs the keys for two child nodes i0 and i1 of node i. Lets $i=i_1 \ldots i_t$. $SK_i$ is parsed into $(R_{i|_0}, R_{i|_1}, \ldots R_{i|_{t-1}}, S_i)$. The element $\rho_i$ is randomly selected from $Z_q$. Lets $R_i = g^{\rho_i}$, $S_{i0} = S_i \cdot H(i0)^{\rho_i}$, $S_{i1} = S_i \cdot H(i1)^{\rho_i}$. The output $SK_{i0} = (R_{i|_0}, R_{i|_1}, \ldots R_{i|_{t-1}}, R_i, S_{i0})$, $SK_{i1} = (R_{i|_0}, R_{i|_1}, \ldots R_{i|_{t-1}}, R_i, S_{i1})$.

KeyGen(PK,i,$SK_\epsilon$): By representing i as $i_1 \ldots i_t$, this algorithm outputs $SK_i = (R_{i|_0}, R_{i|_1}, \ldots R_{i|_{t-1}}, S_i)$. Here $$R_{i|j} = g^{\rho_{i|j}} \; j = \{0, 1, \ldots, t-1\}, \quad S_i = H(\varepsilon)^\alpha \cdot \prod_{j=1}^{t} H(i|_j)^{\rho_{i|_{j-1}}}.$$

$\rho_{i|_j}, j = \{0, 1, \ldots, t-1\}$, is randomly from $Z_q$.

Enc(PK,i,M): Here, $M \in G_2$. i is represented as $i_1 \ldots i_t$. This algorithm randomly selects $\gamma$ from $Z_q$. The output $C = (g^\gamma, H(i|_1)^\gamma, H(i|_2)^\gamma, \ldots, H(i)^\gamma, M \cdot d)$, the symmetrical key $d = \hat{e}(Q, H(\epsilon))^\gamma$.

Dec(PK,i,$SK_i$,C): i is represented as $i_1 \ldots i_t$. $SK_i$ is represented as $(R_{i|_0}, R_{i|_1}, \ldots R_{i|_{t-1}}, S_i)$. C is represented as $(U_0, U_1, \ldots, U_t, V)$. This algorithm outputs $M = V/d$, wherein $$d = \frac{\hat{e}(U_0, S_i)}{\prod_{j=1}^{t} \hat{e}(U_j, R_{i|_{j-1}})}.$$

In the example based on the binary tree encryption scheme, for a given message and an interval, the encryption is performed by using two end points of the interval. The following fact is based on. Starting from a point P within the interval [a,b], point a can be reached at the left side, and point b can be reached at the right side. Starting from a point Q outside of the interval [a,b], however, point a cannot be reached at the left side, and point b cannot be reached at the right side. Therefore, points within the interval and points outside of the interval can be distinguished from each other.

Two binary encryption systems are used. The first binary encryption system is implemented through the right key generating device 302. The second binary encryption system is implemented through the left key generating device 303.

In the first system $S_1$, ones capable of decrypting point a are able to decrypt points larger than a. In the second system $S_2$, ones capable of decrypting point a are able to decrypt points smaller than a. $S_1$ is implemented by assigning an integer in [1,n] to each leaf node of a complete binary tree ($n = 2^d$, d is the depth of the tree). The root node is assigned with 0. If a node P is assigned with x, the left child node of the node P is assigned with 2x, and the right child node of the node P is assigned with 2x+1. If a subscriber U has a key corresponding to an integer u, lets $P_1, P_2, \ldots, P_s$ be all the nodes on the path from the root node to the parent node of u ($P_1$ is the root node of the tree, $P_s$ is the parent node of u). U has also keys corresponding to the right child nodes of $P_1, P_2, \ldots, P_s$. The implementation method for $S_2$ is the same as that for $S_1$. In $S_2$, U has also keys corresponding to the left child nodes of $P_1, P_2, \ldots, P_s$.

Hereafter, $i|_{r_j}$ represents the right brother node of $i|_j$ (if $i|_j$ is the left child node of the parent node), and $i|_{l_j}$ represents the left brother node of $i|_j$ (if $i|_j$ is the right child node of the parent node).

In this example, the initialization device 301 runs Gen($1^k$, $1^d$), d=$\lceil \log_2 n \rceil$ of the BTE scheme, to obtain a primary public key PK=(G1,G2,$\hat{e}$,g,Q,H). $H_d$ is a 4d–1-wise independent set of functions with definition domain $\{0,1\}^{\leq d}$ and value domain $G_1$. H is randomly selected from $H^d$. The root key $SK_\epsilon = H(\epsilon)^\alpha$ of the binary tree is also obtained.

For a subscriber i, the right key generating device 302 selects a random number $\alpha_i$, runs KeyGen (PK,$\omega$,$SK_{\epsilon 1} = H(\epsilon)^{\alpha_i}$) to obtain the right key $SK_i$ of the leaf node i, and obtain right keys $SK_{i|_{l_j}}$ corresponding to the right brother nodes $i|_{r_j}$ of all the nodes $i|_j$ on the path from the root node to the node i. These keys form a "right key set" $DR_i$. The left key generating device 303 runs KeyGen(PK,$\omega$,$SK_{\epsilon 2} = H(\epsilon)^{\alpha-\alpha_i}$) to obtain the left key $SK_i$ of the leaf node i, and left keys $SK_{i|_{l_j}}$ corresponding to the left brother nodes $i|_{l_j}$ of all the nodes $i|_j$ on the path from the root node to the node i. These keys form a "left key set" $DL_i$. The subscriber keys are $D_i = \{DL_i, DR_i\}$, $DL_i = \{SK_i, SK_{i|_{l_j}}, 1 \leq j \leq d, i|_j$ is a right child node$\}$, $DR_i = \{SK_i, SK_{i|_{r_j}}, 1 \leq j \leq d, i|_j$ is a left child node$\}$.

The subscriber grouping device 601 divides subscribers entitled for decryption into a union set $$S = \bigcup_{j=1}^{k} NI_j, \; NI_j = [l_j, r_j], \; 1 \leq l_1 \leq r_1 < l_2 \leq r_2 < \ldots < l_k \leq r_k \leq n.$$

of k intervals.

In encrypting the message M, $\gamma_j$, j=1, 2, ..., k is randomly selected from $Z_q$ and the symmetrical key $K_j = \hat{e}(Q, H(\epsilon))^{\gamma_j} \in G_2$ is calculated. Specifically, for each $NI_j = [l_j, r_j]$, the first encrypting device 602 runs Enc (PK, $l_j$, M), and the second encrypting device 603 runs Enc (PK, $r_j$, M), thereby outputting $C_{l_j} = \{g^{\gamma_j}, H(l_j|_1)^{\gamma_j}, H(l_j|_2)^{\gamma_j}, \ldots, H(l_j)^{\gamma_j}\}$, $C_{r_j} = \{g^{\gamma_j}, H(r_j|_1)^{\gamma_j}, H(r_j|_2)^{\gamma_j}, \ldots, H(r_j)^{\gamma_j}\}$. The header information $HDR = \{C_{l_j}, C_{r_j}\}_{j=1}^{k}$, and the cipher text $C_M = \{C_{Mj}\}$, $C_{Mj} = M \cdot K_j$ are obtained, and $K_j$ is randomly selected from the symmetrical key space.

The receiving device 801 obtains the header information and the cipher text.

Assuming that the identity of a receiving subscriber is i, $\zeta \geq i, \eta \leq i$ is a natural number, the binary representation of $\eta$ is $\eta_1 \eta_2 \ldots \eta_d$, and the binary representation of $\zeta$ is $\zeta_1 \zeta_2 \ldots \zeta_d$. The searching device 802 finds a j, $1 \leq j \leq d$, where $SK_{\eta|_{l_j}}$ is a part of $DL_i$, and finds another j meeting $1 \leq j \leq d$, where $SK_{\zeta|_{l_j}}$ is a part of $DR_i$.

With respect to the first found j, the key deriving device 803 runs Der (PK,i,$SK_i$) to generate the key $$SK_\eta = \left[ R_{\eta|_0}, \ldots, R_{\eta|_{j-1}}, H(\varepsilon)^{\alpha-\alpha_j} \cdot \prod_{j=1}^{d} H(\eta|_i)^{\rho \eta_{k-1}} \right],$$

where $SK_\eta$ is $dl_\eta$. With respect to the second found j, the key deriving device 803 runs Der (PK,i,$SK_i$) to generate $$SK_\zeta = \left[ R_{\zeta|_0}, \ldots, R_{\zeta|_{d-1}}, H(\varepsilon)^{\alpha_i} \cdot \prod_{i=1}^{d} H(\zeta|_i)^{\rho \zeta|_i} \right],$$

where $SK_\zeta$ is $dr_\zeta$.

Assuming i is within the interval $NI_j$, $NI_j = [l_j, r_j]$, $1 \leq j \leq k$. The key recovering device 804 runs Dec(PK,$r_j$,$dr_{r_j}$,$C_{r_j}$) to obtain the second session key $d_1 = \hat{e}(g, H(\epsilon))^{\gamma_j \alpha_i}$, where $$dr_{r_i} = \left[ R_{r_j|_0} = g^{\rho_{r_j|_0}}, \ldots, R_{r_j|_{d-1}} = g^{\rho_{r_j|_{d-1}}}, H(\varepsilon)^{\alpha_i} \cdot \prod_{i=1}^{d} H(r_j|_i)^{\rho_{r_j|_{i-1}}} \right],$$

$C_{r_j}=\{g^{\gamma_j},H(r_j|_1)^{\gamma_j},H(r_j|_2)^{\gamma_j},\ldots,H(r_j)^{\gamma_j}\}$. The key recovering device 804 also runs $Dec(PK,l_j,dl_j,C_{l_j})$ to obtain the first session key $d_2=\hat{e}(g,H(\epsilon))^{\gamma_j(\alpha-\alpha_i)}$, where $$dl_j = \left[R_{l_j|_0} = g^{\rho_{l_j|_0}}, \ldots, R_{l_j|_{d-1}} = g^{\rho_{l_j|_{d-1}}}, H(\varepsilon)^{\alpha-\alpha_j} \cdot \prod_{i=1}^{d} H(l_j|_i)^{\rho_{l_j|_{i-1}}}\right],$$

$C_{l_j}\{g^{65\ j},H(l_j|_1)^{\gamma_j},H(l_j|_2)^{\gamma_j},\ldots,H(l_j)^{\gamma_j}\}$. The key recovering device 804 further calculates the symmetrical key $\hat{e}(Q,H(\epsilon))^{\gamma_j}$ with $d_1$ and $d_2$.

The decrypting device 805 decrypts the cipher text with the symmetrical key.

Instance II

Preliminaries: Boneh-Boyen-Boh Encryption Scheme

Lets G represents a group of order p (p is a prime number), and e: $G \times G \to G_1$ represents a bilinear map. The identity ID is an element of $(Z^*_p)^k$, and is represented as $ID=(I_1,\ldots,I_k) \in (Z^*_p)^k$.

The Boneh-Boyen-Boh encryption scheme is composed of the following five algorithms:

Setup(1): g is randomly selected from G, $\alpha$ is randomly selected from $Z_p$, lets $g_1=g^\alpha$. The elements $g_2,g_3,h_1,\ldots,h_l$ are randomly selected from G. The system public parameter PK= $(g,g_1,g_2,g_3,h_1,\ldots,h_l)$, and the primary key is $g_2^\alpha$.

KeyGen($d_{ID|k-1}$,ID): r is randomly selected from $Z_p$, $d_{ID}=(g_2^\alpha(h_1^{I_1}\ldots h_k^{I_k}g_3)^r,g^r,h_{k+1}^r,\ldots,h_l^r)$ is output.

Der($d_{ID|k-1}$): $d_{ID}$ is calculated from $d_{ID|k-1}$. For example, $d_{ID|k-1}=(g_2^\alpha(h_1^{I_1}\ldots h_{k-1}^{I_{k-1}}g_3)^{r'},g^{r'},h_k^{r'},\ldots,h_l^{r'})=(a_0,a_1,b_k,\ldots,b_l)$, t is randomly selected from $Z_p$, $d_{ID}=(a_0 b_k^{I_k}(h_1^{I_1}\ldots h_k^{I_k}g_3)^t,a_1 g^t,b_{k+1}h_{k+1}^t,\ldots,b_l h_l^t)$.

Encrypt(PK, ID, M): Here, message $M \in G_1$, $ID=(I_1,\ldots,I_k) \in (Z^*_p)^k$. The algorithm randomly selects s from $Z_p$, and outputs $CT=(e(g_1,g_2)^s M,g^s,(h_1^{I_1}\ldots h_k^{I_k}g_3)^s)$.

Decrypt($d_{ID}$,CT): Lets (A,B,C)=CT, $(a_0,a_1,b_{k+1},\ldots,b_l)=d_{ID}$, and $Ae(a_1,C)/e(B,a_0)$ is output.

In the example based on the Boneh-Boyen-Boh encryption scheme, the initialization device 301 runs Setup($1^d$) (here, d meets $n=2^d$), obtains the public parameter PK and the primary key master-key. The system public parameter is PK=(g, $g_1=g^\alpha,g_2,gL_3,gR_3,hL_1,\ldots,hL_d,hR_1,\ldots,hR_d$).

An integer i in each [1,n] is associated with the i-th leaf node in the binary tree (the leaf nodes of the binary tree are numbered as 1, 2, 3, . . . , n from left to right). For the i-th receiving subscriber, the right key generating device 302 selects a random number $\alpha_i$, runs KeyGen($d_{ID|k-1}$,ID) to obtain the right key $d_i$ corresponding to the leaf node i, and right keys $d_{i|r_j}$ corresponding to the right child nodes of all the nodes on the path from the root node to the leaf node, with $g_2^{\alpha_i}$ as the primary key and $(g,g_2,gR_3,hR_1,\ldots,hR_d)$ as the public parameter. These right keys form $DR_i$.

The left key generating device 303 runs KeyGen($d_{ID|k-1}$, ID) to obtain the left key $d_i$ corresponding to the leaf node i, and left keys $d_{i|r_j}$ corresponding to the left child nodes of all the nodes on the path from the root node to the leaf node, with $g_2^{\alpha-\alpha_i}$ as the primary key and $(g,g_2,gL_3,hL_1,\ldots,hL_d)$ as the public parameter. These keys form $DL_i$. The key for the i-th receiving subscriber is $D_i=\{DL_i, DR_i\}$.

The subscriber grouping device 601 divides subscribers entitled for decryption into a union set $$S = \bigcup_{j=1}^{k} NI_j, NI_j = [l_j, r_j], 1 \leq l_1 \leq r_1 < l_2 \leq r_2 < \ldots < l_k \leq r_k \leq n$$

of k intervals.

In encrypting the message M, $\gamma_j$, $j=1, 2, \ldots, k$ is randomly selected from $Z_q$ and $K_j=\hat{e}(g_1,g_2)^{\gamma_j}$, $j=1, 2, \ldots, k$ is obtained. Specifically, for each $NI_j$, the first encrypting device 602 runs Encrypt(($g,g_1,g_2,gL_3,hL_1,\ldots,hL_d$), $l_j$), and the second encrypting device 603 runs Encrypt(($g,g_1,g_2,gR_3,hR_1,\ldots,hR_d$), $r_j$), thereby obtaining $C_{l_j}=\{g^{\gamma_j},(hL_1^{l_{j1}}\ldots hL_d^{l_{jd}}gL_3)^{\gamma_j}\}$ and $C_{r_j}=\{g^{\gamma_j},(hR_1^{r_{j1}}\ldots hR_d^{r_{jd}}gR_3)^{\gamma_j}\}$ respectively. Thus the header information $HDR=\{C_{l_j},C_{r_j}\}_{j=1}^{k}$ and the cipher text $C_M=\{C_{Mj}\}$, $C_{Mj}=M \cdot K_j$ are obtained.

The receiving device 801 obtains the header information and the cipher text.

Assuming that $\eta \leq i$, $\zeta \geq i, \eta \leq i$ is a natural number, the binary representation of $\eta$ is $\eta_1 \ldots \eta_d$, and the binary representation of $\zeta$ is $\zeta_1 \ldots \zeta_d$. The searching device 802 finds an integer j meeting $1 \leq j \leq d$, and $d_{\eta|_j}$ is a part of $DL_i$ (here, $\eta|_j = \eta_1 \ldots \eta_j$). The searching device 802 also finds another integer j meeting $1 \leq j \leq d$, and $d_{\zeta|_j}$ is a part of $DR_i$ (here, $\zeta|_j = \zeta_1 \ldots \zeta_d$).

For the first integer j, the key deriving device 803 runs Der( ) to obtain $d_\eta=[g_2^{\alpha-\alpha_i}(hL_1^{\eta_1}\ldots hL_d^{\eta_d}gL_3)^r, g^r]$, lets $dl_\eta = d_\eta$. For the second integer j, the key deriving device 803 runs Der( ) to obtain $d_\zeta=[g_2^{\alpha_i}(hR_1^{\zeta_1}\ldots hR_d^{\zeta_d}gR_3)^{r'}, g^{r'}]$, lets $dr_\zeta = d_\zeta$.

Assuming that $i \in NI_j=[l_j,r_j]$, $1 \leq j \leq k$, the key deriving device 803 obtains $d_{r_j}$ and $dl_{l_j}$, the binary representation of $l_j$ is $l_{j1},\ldots,l_{jd}$, and the binary representation of $r_j$ is $r_{j1},\ldots,r_{jd}$. The key recovering device 804 runs Decrypt $(dr_{r_j},C_{r_j}=\{g^{\gamma_j},(hR_1^{r_{j1}}\ldots hR_d^{r_{jd}}gR_3)^{\gamma_j}\})$ to obtain the second session key $d=\hat{e}(g,g_2)^{\gamma_j \alpha_i}$, and runs decrypt $(dl_{l_j},C_{l_j}=\{g^{\gamma_j},(hL_1^{l_{j1}}\ldots hL_d^{l_{jd}}gL_3)^{\gamma_j}\})$ to obtain the first session key $\hat{e}(g,g_2)^{\gamma_j(\alpha-\alpha_i)}$.

The key recovering device 804 obtains the symmetrical key $\hat{e}(g_1,g_2)^{\gamma_j}$ according to the first and second session keys.

The decrypting device 805 decrypts the cipher text with the symmetrical key.

It should be noted that the public parameters are $gL_3$, $hL_1,\ldots,hL_d$ and $gR_3,hR_1,\ldots,hR_d$ respectively in the two encryption systems.

As compared with the BW1 scheme and the BW2 scheme proposed by Boneh, the embodiments of the present invention occupies less space. The space comparison is as shown in the following table (in the table, k represents the set S is a union set of k intervals):

|  | present invention | BW1 scheme | BW2 scheme |
| --- | --- | --- | --- |
| Public key | O(log n) | O(n) | O($\sqrt{n}$) |
| Key | O(log n) | O(1) | O(1) |
| Cipher text | O(k log n) | O(1) | O($\sqrt{n}$) |

Figure 10:
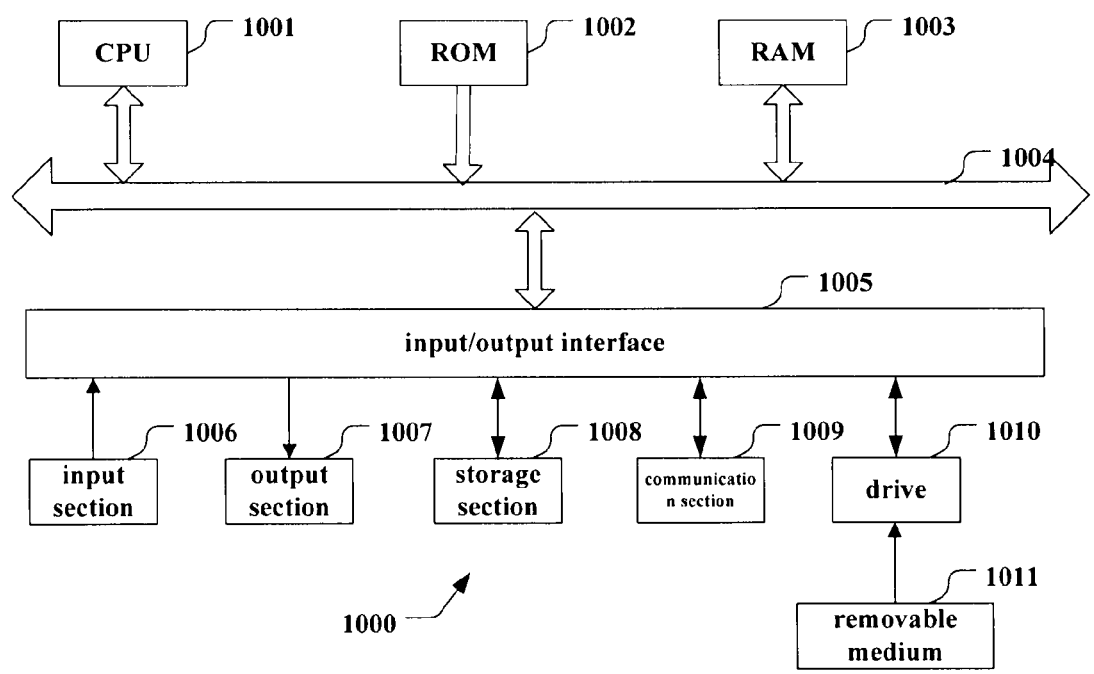
FIG. 10 is a block diagram showing the exemplary structure of a computer for implementing the embodiments of the present invention.

FIG. 10 is a block diagram showing the exemplary structure of a computer for implementing the embodiments of the present invention.

In FIG. 10, a central processing unit (CPU) 1001 performs various processes in accordance with a program stored in a read only memory (ROM) 1002 or a program loaded from a storage section 1008 to a random access memory (RAM)

1003. In the RAM 1003, data required when the CPU 1001 performs the various processes or the like is also stored as required.

The CPU 1001, the ROM 1002 and the RAM 1003 are connected to one another via a bus bus 1004. An input/output interface 1005 is also connected to the bus 1004.

The following components connected to input/output interface 1005: an input section 1006 including a keyboard, a mouse, or the like; an output section 1007 including a display such as a cathode ray tube (CRT), a liquid crystal display (LCD), or the like, and a loudspeaker or the like; the storage section 1008 including a hard disk or the like; and a communication section 1009 including a network interface card such as a LAN card, a modem, or the like. The communication section 1009 performs a communication process via the network such as the internet.

A drive 1010 is also connected to the input/output interface 1005 as required. A removable medium 1011, such as a magnetic disk, an optical disk, a magneto-optical disk, a semiconductor memory, or the like, is mounted on the drive 1010 as required, so that a computer program read therefrom is installed into the storage section 1008 as required.

In the case where the above-described steps and processes are implemented by the software, the program that constitutes the software is installed from the network such as the internet or the storage medium such as the removable medium 1011.

One skilled in the art should note that, this storage medium is not limit to the removable medium 1011 having the program stored therein as illustrated in FIG. 10, which is delivered separately from the approach for providing the program to the user. Examples of the removable medium 1011 include the magnetic disk, the optical disk (including a compact disk-read only memory (CD-ROM) and a digital versatile disk (DVD)), the magneto-optical disk (including a mini-disk (MD)), and the semiconductor memory. Alternatively, the storage medium may be the ROM 1002, the hard disk contained in the storage section 1008, or the like, which have the program stored therein and is deliver to the user together with the method that containing them.

The present invention is described in the above by referring to specific embodiments. One skilled in the art should understand that various modifications and changes can be made without departing from the scope as set forth in the following claims.

What is claimed is:

1. A method of key generation performed by an apparatus based on a hierarchical identity based encryption scheme, comprising:
   generating, by a processor of the apparatus, a public parameter and a primary key through an initializing method of the encryption scheme, wherein the primary key is based on a first random number;
   with respect to each of leaf nodes in a binary tree where subscriber identities are represented by the leaf nodes in the same level, calculating a right key set of a leaf node according to the encryption scheme based on the public parameter, the identity of the leaf node and a right primary key obtained by replacing the first random number with a second random number, the right key set including a right key of the leaf node and right keys of right brother nodes for all the nodes on a path from a root node to the leaf node; and
   with respect to the leaf nodes, calculating a left key set of the leaf node according to the encryption scheme based on the public parameter, the identity of the leaf node and a left primary key obtained by replacing the first random number with a third random number, the left key set including a left key of the leaf node and left keys of left brother nodes for all the nodes on the path from the root node to the leaf node,
   wherein the sum of the second random number and the third random number equals to the first random number, and the second random number is different for different subscribers.

2. The method according to claim 1, wherein the encryption scheme is a binary tree encryption scheme of a maximum depth $d=\lceil \log_2 n \rceil$ and the public parameter includes a function randomly selected from a 4d−1-wise independent family of functions, where n is a number of subscribers.

3. The method according to claim 1, wherein the encryption scheme is a Boneh-Boyen-Goh encryption scheme of a maximum depth $d=\lceil \log_2 n \rceil$, where n is a number of subscribers.

4. The method according to claim 3, wherein the public parameter comprises a first $g_3$ parameter and a second $g_3$ parameter different from each other, wherein the first $g_3$ parameter is used for generating the right key set, and the second $g_3$ parameter is used for generating the left key set.

5. A method of encryption performed by an apparatus based on a hierarchical identity based encryption scheme, comprising:
   dividing, by a processor of the apparatus, the identities of subscribers entitled to decrypt a broadcast content into at least one interval;
   with respect to each of the interval, encrypting the broadcast content through the encrypting method of the encryption scheme based on a public parameter of the encryption scheme, the lower limit of the interval and a random number associated with the interval, to generate a cipher text and header information associated with the lower limit; and
   with respect to each of the interval, encrypting the broadcast content through the encrypting method of the encryption scheme based on the public parameter of the encryption scheme, the upper limit of the interval and the random number associated with the interval, to generate a cipher text and header information associated with the upper limit,
   wherein a symmetrical key adopted by the encrypting method of the encryption scheme is based on the random number associated with the interval, and the random number associated with the respective interval is different from each other.

6. The method according to claim 5, wherein the encryption scheme is a binary tree encryption scheme of a maximum depth $d=\lceil \log_2 n \rceil$, and the public parameter includes a function randomly selected from a 4d−1-wise independent family of functions, where n is a number subscribers.

7. The method according to claim 5, wherein the encryption scheme is a Boneh-Boyen-Goh encryption scheme of a maximum depth $d=\lceil \log_2 n \rceil$, where n is a number of subscribers.

8. The method according to claim 7, wherein the public parameter comprises a first $g_3$ parameter and a second $g_3$ parameter different from each other, wherein the first $g_3$ parameter is used for encryption based on the lower limit, and the second $g_3$ parameter is used for encryption based on the upper limit.

9. A method performed by an apparatus of decryption based on a hierarchical identity based decrypt scheme, comprising:
   receiving information about intervals into which the identities of subscribers entitled to decrypt a broadcast content are divided, a cipher text and header information associated with lower limit of each of the intervals, and a cipher text and header information associated with upper limit of each of the intervals;

finding, by a processor of the apparatus, one of the intervals where the identity of receiving subscriber resides, such that in a binary tree where subscriber identities are represented by leaf nodes in the same level, a left key of one node on a path from a root node to a lower limit node of the interval is included in the left key set of the receiving node corresponding to the identity of the receiving subscriber, and a right key of one node on a path from the root node to the upper limit node of the interval is included in the right key set of the receiving node;

calculating the left key of the lower limit node through the key deriving method of the encryption scheme based on a public parameter, the identity of the node whose left key is included in the left key set and the left key of the node;

calculating the right key of the upper limit node through the key deriving method of the encryption scheme based on the public parameter, the identity of the node whose right key is included in the right key set and the right key of the node;

obtaining a first session key through the decrypting method of the encryption scheme based on the header information associated with the lower limit of the found interval, the left key of a respective lower limit node, the lower limit and the public parameter;

obtaining a second session key through the decrypting method of the encryption scheme based on the header information associated with the upper limit of the found interval, the right key of a respective upper limit node, the upper limit and the public parameter;

obtaining a symmetrical key based on the first session key and the second session key; and decrypting the cipher text associated with the found interval with the symmetrical key.

10. The method according to claim 9, wherein the encryption scheme is a binary tree encryption scheme of a maximum depth $d=\lceil \log_2 n \rceil$, and the public parameter includes a function randomly selected from a 4d−1-wise independent family of functions, where n is a number of subscribers.

11. The method according to claim 9, wherein the encryption scheme is a Boneh-Boyen-Goh encryption scheme of a maximum depth $d=\lceil \log_2 n \rceil$, where n is a number of subscribers.

12. The method according to claim 11, wherein the public parameter comprises a first $g_3$ parameter and a second $g_3$ parameter different from each other, wherein the first $g_3$ parameter is used for generating the right key set and encryption based on the lower limit, and the second $g_3$ parameter is used for generating the left key set and encryption based on the upper limit.

13. An apparatus for key generation based on a hierarchical identity based encryption scheme, comprising:

an initialization device which generates a public parameter and a primary key through an initializing method of the encryption scheme, wherein the primary key is based on a first random number;

a right key set generating device which, with respect to each of leaf nodes in a binary tree where subscriber identities are represented by the leaf nodes in the same level, calculates a right key set of a leaf node according to the encryption scheme based on the public parameter, the identity of the leaf node and a right primary key obtained by replacing the first random number with a second random number, the right key set including a right key of the leaf node and right keys of right brother nodes for all the nodes on a path from a root node to the leaf node; and a left key set generating device which, with respect to the leaf nodes, calculates a left key set of the leaf node according to the encryption scheme based on the public parameter, the identity of the leaf node and a left primary key obtained by replacing the first random number with a third random number, the left key set including a left key of the leaf node and left keys of left brother nodes for all the nodes on the path from the root node to the leaf node, wherein the sum of the second random number and the third random number equals to the first random number, and the second random number is different for different subscribers.

14. The apparatus according to claim 13, wherein the encryption scheme is a binary tree encryption scheme of a maximum depth $d=\lceil \log_2 n \rceil$, and the public parameter includes a function randomly selected from a 4d−1-wise independent family of functions, where n is a number of subscribers.

15. The apparatus according to claim 13, wherein the encryption scheme is a Boneh-Boyen-Goh encryption scheme of a maximum depth $d=\lceil \log_2 n \rceil$, where n is a number of subscribers.

16. The apparatus according to claim 15, wherein the public parameter comprises a first $g_3$ parameter and a second $g_3$ parameter different from each other, wherein the first $g_3$ parameter is used for generating the right key set, and the second $g_3$ parameter is used for generating the left key set.

17. An apparatus for encryption based on a hierarchical identity based encryption scheme, comprising:

a subscriber grouping device which divides the identities of subscribers entitled to decrypt a broadcast content into at least one interval;

a first encrypting device which, with respect to each of the interval, encrypts the broadcast content through the encrypting method of the encryption scheme based on a public parameter of the encryption scheme, the lower limit of the interval and a random number associated with the interval, to generate a cipher text and header information associated with the lower limit; and a second encrypting device which, with respect to each of the interval, encrypts the broadcast content through the encrypting method of the encryption scheme based on the public parameter of the encryption scheme, the upper limit of the interval and the random number associated with the interval, to generate a cipher text and header information associated with the upper limit;

wherein a symmetrical key adopted by the encrypting method of the encryption scheme is based on the random number associated with the interval, and the random number associated with the respective interval is different from each other.

18. The apparatus according to claim 17, wherein the encryption scheme is a binary tree encryption scheme of a maximum depth $d=\lceil \log_2 n \rceil$, and the public parameter includes a function randomly selected from 4d−1-wise independent family of functions, where n is a number of subscribers.

19. The apparatus according to claim 17, wherein the encryption scheme is a Boneh-Boyen-Goh encryption scheme of a maximum depth $d=\lceil \log_2 n \rceil$, where n is a number of subscribers.

20. The apparatus according to claim 19, wherein the public parameter comprises a first $g_3$ parameter and a second $g_3$ parameter different from each other, wherein the first $g_3$ parameter is used for encryption based on the lower limit, and the second $g_3$ parameter is used for encryption based on the upper limit.

21. An apparatus for decryption based on a hierarchical identity based encryption scheme, comprising:

a receiving device which receives information about intervals into which the identities of subscribers entitled to decrypt a broadcast content are divided, a cipher text and header information associated with lower limit of each of the intervals, and a cipher text and header information associated with upper limit of each of the intervals;

a searching device which finds one of the intervals where the identity of a receiving subscriber resides, such that in a binary tree where subscriber identities are represented by leaf nodes in the same level, a left key of one node on a path from a root node to a lower limit node of the interval is included in the left key set of the receiving node corresponding to the identity of the receiving subscriber, and a right key of one node on a path from the root node to the upper limit node of the interval is included in the right key set of the receiving node;

a key deriving device which calculates the left key of the lower limit node through the key deriving method of the encryption scheme based on a public parameter, the identity of the node whose left key is included in the left key set and the left key of the node, and calculates the right key of the upper limit node through the key deriving method of the encryption scheme based on the public parameter, the identity of the node whose right key is included in the right key set and the right key of the node; and a key recovering device which obtains a first session key through the decrypting method of the encryption scheme based on the header information associated with the lower limit of the found interval, the left key of a respective lower limit node, the lower limit and the public parameter, obtains a second session key through the decrypting method of the encryption scheme based on the header information associated with the upper limit of the found interval, the right key of a respective upper limit node, the upper limit and the public parameter, and obtains a symmetrical key based on the first session key and the second session key; and a decrypting device which decrypts the cipher text associated with the found interval with the symmetrical key.

22. The apparatus according to claim 21, wherein the encryption scheme is a binary tree encryption scheme of a maximum depth $d=\lceil \log_2 n \rceil$, and the public parameter includes a function randomly selected from 4d−1-wise independent family of functions, where n is a number of subscribers.

23. The apparatus according to claim 21, wherein the encryption scheme is a Boneh-Boyen-Goh encryption scheme of a maximum depth $d=\lceil \log_2 n \rceil$, where n is a number of subscribers.

24. The apparatus according to claim 23, wherein the public parameter comprises a first $g_3$ parameter and a second $g_3$ parameter different from each other, wherein the first $g_3$ parameter is used for generating the right key set and encryption based on the lower limit, and the second $g_3$ parameter is used for generating the left key set and encryption based on the upper limit.

* * * * *